(12) United States Patent
Morgan

(10) Patent No.: US 8,276,208 B2
(45) Date of Patent: Sep. 25, 2012

(54) SECURITY-LEVEL ENFORCEMENT IN VIRTUAL-MACHINE FAIL-OVER

(75) Inventor: Dennis Morgan, Pine Grove, CA (US)

(73) Assignee: Intel Corporation, Santa Clara, CA (US)

( * ) Notice: Subject to any disclaimer, the term of this patent is extended or adjusted under 35 U.S.C. 154(b) by 1305 days.

(21) Appl. No.: 11/967,782

(22) Filed: Dec. 31, 2007

(65) Prior Publication Data

US 2009/0172799 A1   Jul. 2, 2009

(51) Int. Cl.
*H04L 29/06* (2006.01)
(52) U.S. Cl. .................. 726/27; 726/2; 714/4.11; 718/1
(58) Field of Classification Search .................. 714/4.11; 726/2, 29, 27
See application file for complete search history.

(56) References Cited

U.S. PATENT DOCUMENTS

| 7,844,251 | B2 * | 11/2010 | Chen et al. ..................... 455/410 |
| 2003/0204700 | A1 * | 10/2003 | Biessener et al. ............ 711/202 |
| 2004/0205101 | A1 | 10/2004 | Radhakrishnan |
| 2004/0236987 | A1 | 11/2004 | Greenspan et al. |
| 2006/0190766 | A1 | 8/2006 | Adler et al. |
| 2007/0016663 | A1 | 1/2007 | Weis |
| 2007/0174658 | A1 | 7/2007 | Takamoto et al. |
| 2007/0207729 | A1 * | 9/2007 | Chen et al. ..................... 455/15 |
| 2008/0086609 | A1 * | 4/2008 | Lesser et al. ................... 711/162 |
| 2008/0155215 | A1 * | 6/2008 | Matsuzaki et al. ............ 711/162 |
| 2009/0019170 | A1 * | 1/2009 | Wyss et al. ..................... 709/229 |

OTHER PUBLICATIONS

Answers.com definition of the term "failure".*
Du et al., "Paratus: Instantaneous Failover via Virtual Machine Replication", 2009, Eigth International Conference on Grid and Cooperative Computing, pp. 307-312.*
Office Action for Chinese Patent Application 200810189755.5, mailed Oct. 21, 2010, 8 pages.
Decision to Grant Patent for Japanese Application No. 2008-331288, dated Mar. 6, 2012, 3 pages.

* cited by examiner

*Primary Examiner* — Taghi Arani
*Assistant Examiner* — Thaddeus Plecha
(74) *Attorney, Agent, or Firm* — Schwabe, Williamson & Wyatt, P.C.

(57) ABSTRACT

Methods, systems, and articles to receive, by a fail-over computing device, a request to instantiate a virtual-machine in response to a virtual-machine failure on a separate physical device. The request includes a minimum security rating. The fail-over computing device then compares the minimum security rating against an assigned security rating of the fail-over computing device and instantiates the virtual-machine if the assigned security rating meets or exceeds the minimum security rating.

9 Claims, 4 Drawing Sheets

SECURITY-LEVEL ENFORCEMENT IN VIRTUAL-MACHINE FAIL-OVER

TECHNICAL FIELD

Embodiments of the present invention relate to the field of computer science; in particular to assigning security ratings and enforcing minimum security requirements during virtual-machine failover.

BACKGROUND

A virtualized computer system can recover from a virtual-machine failure on one computing device by instantiating a fail-over virtual-machine on either the same computing device or on a separate fail-over computing device. However, there is currently no assurance that the fail-over computing device has a security-level appropriate for the functions and data of the virtual-machine. For example, a domain controller typically requires a high level of security. Instantiating a domain controller virtual-machine on a fail-over computing device with a relatively low security-level potentially leaves critical data and functions at risk. For example, a potential intruder may launch a denial-of-service attack against a virtualized computer system containing sensitive information hoping that the computer system will fail-over to another system with fewer security controls protecting the stored data. One known solution is to manually place computing devices into fail-over groups based on security characteristics of the devices.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

DETAILED DESCRIPTION OF EMBODIMENTS OF THE INVENTION

Figure 1:
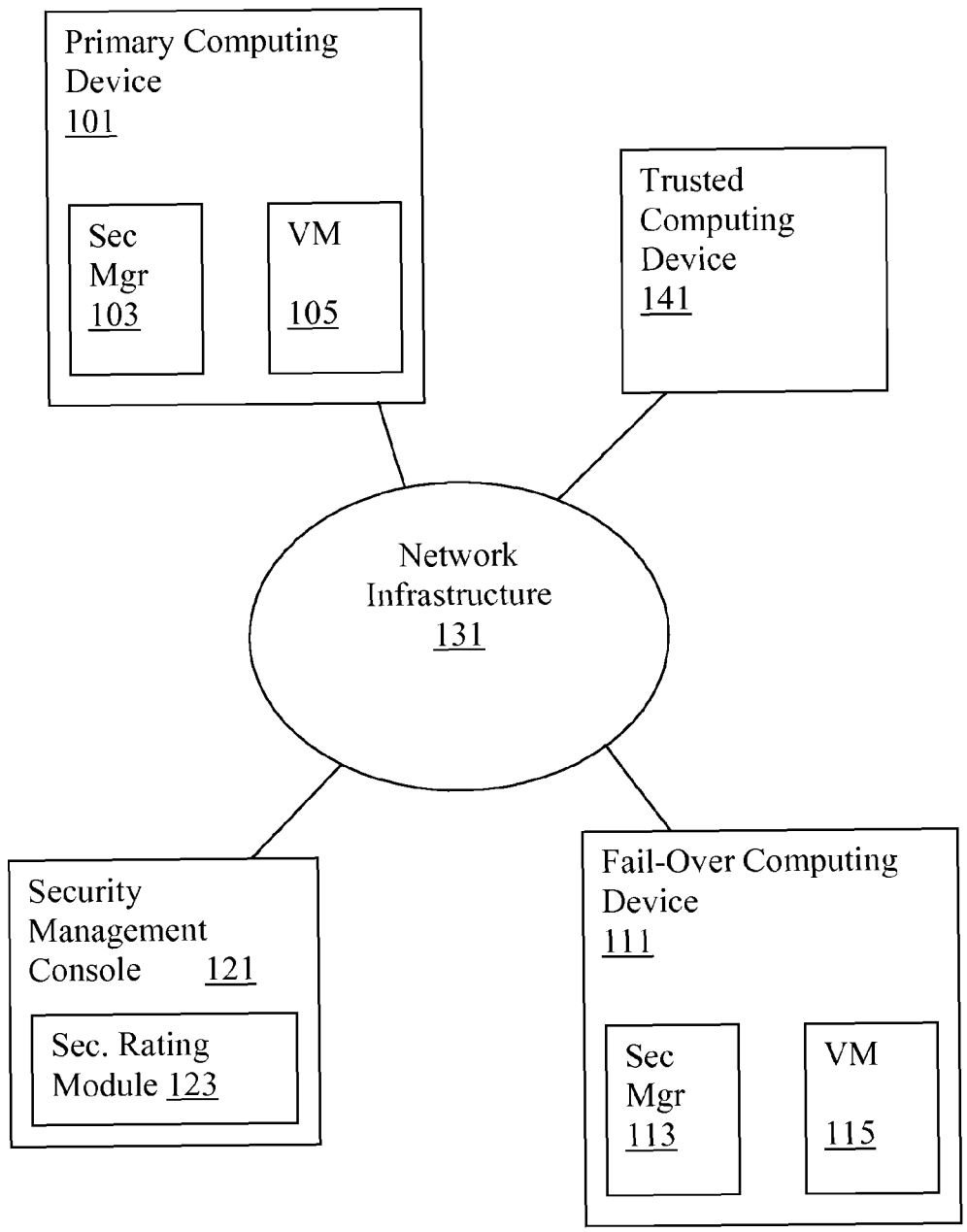
FIG. 1 illustrates an overview of computing devices running a security manager in communication with each other and with a security management console in accordance with various embodiments.

In the following detailed description, reference is made to the accompanying drawings which form a part hereof, and in which are shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order-dependent. Also, embodiments may have fewer operations than described. A description of multiple discrete operations should not be construed to imply that all operations are necessary.

The description may use perspective-based descriptions such as up/down, back/front, and top/bottom. Such descriptions are merely used to facilitate the discussion and are not intended to restrict the application of embodiments of the present invention.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" means A or B. For the purposes of the description, a phrase in the form "A and/or B" means "(A), (B), or (A and B)". For the purposes of the description, a phrase in the form "at least one of A, B, and C" means "(A), (B), (C), (A and B), (A and C), (B and C), or (A, B and C)". For the purposes of the description, a phrase in the form "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Various embodiments include methods, apparatuses, and systems for assigning security ratings and enforcing minimum security requirements during virtual-machine failover. In exemplary embodiments of the present invention, a computing system may be endowed with one or more components of the disclosed apparatuses and/or systems and may be employed to perform one or more methods as disclosed herein.

FIG. 1 illustrates a diagram of computing devices running a security manager in communication with each other and with a security management console in accordance with various embodiments. Primary computing device 101 includes security manager 103 and virtual-machine 105. In embodiments, security manager 103 and virtual-machine 105 may be implemented as software applications permanently stored on a disk storage device, temporarily stored in a dynamic random access memory (DRAM) or similar memory device, and/or executed by a processor (CPU) of primary computing device 101. Virtual-machine 105 may be an operating system configured to run on primary computing device 101. Virtual-machine 105 may be configured to provide a runtime environment for one or more applications such as, for example, server applications and/or client applications. In embodiments, security manager 103 may be configured to run independently of virtual-machine 105. In particular, where virtual-machine 105 is an operating system, security manager 103 may be configured to run independently of the operating system.

Fail-over computing device 111 may include, in embodiments, security manager 113 and virtual-machine 115. In various embodiments, security manager 103 may be the same or different than security manager 113. In various embodiments, virtual-machine 105 may be the same or different than virtual-machine 115. In embodiments, security manager 113 may be configured to instantiate virtual-machine 115 in response to a request from security manager 103. In embodiments, virtual-machine 115 may be configured to perform some or all of the functions of virtual-machine 105. Primary computing device 101 and fail-over computing device 111 are labeled as such for ease of understanding only. In embodiments, primary computing device 101 may act as a fail-over device for fail-over device 111 and vice versa. These labels should not be construed in a limiting sense.

Security management console 121 may be a separate computing device and include, among other things, security rating module 123. Primary computing device 101, fail-over computing device 111, and security management console 121 may each be connected to network infrastructure 131 via any of various network interface components (not shown). Network infrastructure 131 may include one or more of wireless and/or wired segments. Network infrastructure 131 may include the Internet or other wide-area network. As such, in embodiments, primary computing device 101, fail-over computing device 111, and security management console 121 may each be located in different geographical locations. In embodiments, two or more of such devices may be located in the same geographical location. Embodiments are not limited to any particular geographical or network infrastructure topologies. In embodiments, security management console 121 may also include a security manager and/or a virtual-machine.

In embodiments, security managers 103 and 113 may be configured to request from security rating module 123, a security rating for primary computing device 101 and fail-over computing device 111, respectively. In embodiments, these requests may occur upon powering-on of the computing device(s). In embodiments, these requests may be sent at predetermined periodic intervals, such as for example, once every 24 hours or at other intervals. In embodiments, these requests may include security characteristics information regarding the computing devices. Such information may include, for example, a physical location of the computing devices, security controls of the computing devices (such as, for example, internal and/or external firewalls protecting the device and physical controls protecting the device), a function of the computing devices, the criticality of the data stored on the computing devices, hardware redundancy, and other information. In embodiments, some or all of this information may be manually entered upon installation of the computing devices. In embodiments, some or all of this information may be generated in some automated fashion.

In response to the request, security rating module 123 may be configured to assign a security rating for the computing devices based on the received information and/or other criteria. In embodiments, security management console may include stored security characteristics information regarding the computing devices such as, for example, a physical location of the computing devices, security controls of the computing devices (such as, for example, internal and/or external firewalls protecting the device and physical controls protecting the device), a function of the computing devices, the criticality of the data stored on the computing devices, hardware redundancy, and other information. In embodiments, security management console 121 may be configured to determine the security rating based on such stored information either alone or in combination with received information. The assigned security rating may be sent by security management console 121 back to the computing devices.

As described in more detail below, if primary computing device 101 suffers a virtual-machine 105 failure—such as an operating system crash or other error—security manager 103 may be configured to request and receive a fail-over device network address (or other identifier) of one or more fail-over devices such as, for example, fail-over computing device 111. This request may be sent, in embodiments, to trusted computing device 141 or—in alternate embodiments—to security management console 121. Security manager 103 may be configured to next send a request to fail-over computing device 111 to instantiate virtual-machine 115 to perform the function(s) of failed virtual-machine 105. In embodiments, the request may include a minimum security rating. In embodiments, the minimum security rating may be the security rating assigned to primary computing device 103. Fail-over computing device 111 may be configured to instantiate the virtual-machine only if its own assigned security rating meets or exceeds the minimum security rating. If it does not meet or exceed the minimum security rating, fail-over computing device 111 may be configured to send a refusal message to primary computing device 101. In that case, primary computing device 101 may be configured in embodiments to send a fail-over request to a second fail-over device.

In this way, a fail-over security policy may be enforced. By requiring the security manager of the fail-over computing device to check its assigned security rating before instantiating a fail-over virtual-machine, a minimum security-level may be provided for each instantiation of a fail-over virtual-machine. This has advantages over manually placing each device into fail-over groups. Security characteristics and/or the availability of devices may change over time. But network managers may fail to recognize these changes and/or manually update the fail-over groups in response. Also, in embodiments, devices that exceed a minimum security-level may be utilized to instantiate a fail-over virtual-machine, thereby using available network resources more efficiently. Doing this would be impractical with manually-entered groups because a low-security device manually grouped with a higher-security device—so that the higher-security device can act as a fail-over for the low-security device—may be used to instantiate a fail-over virtual-machine for the high-security device and compromise the security of the fail-over virtual-machine. Additionally, in large enterprise systems, manual grouping would be quite time-consuming.

Figure 2:
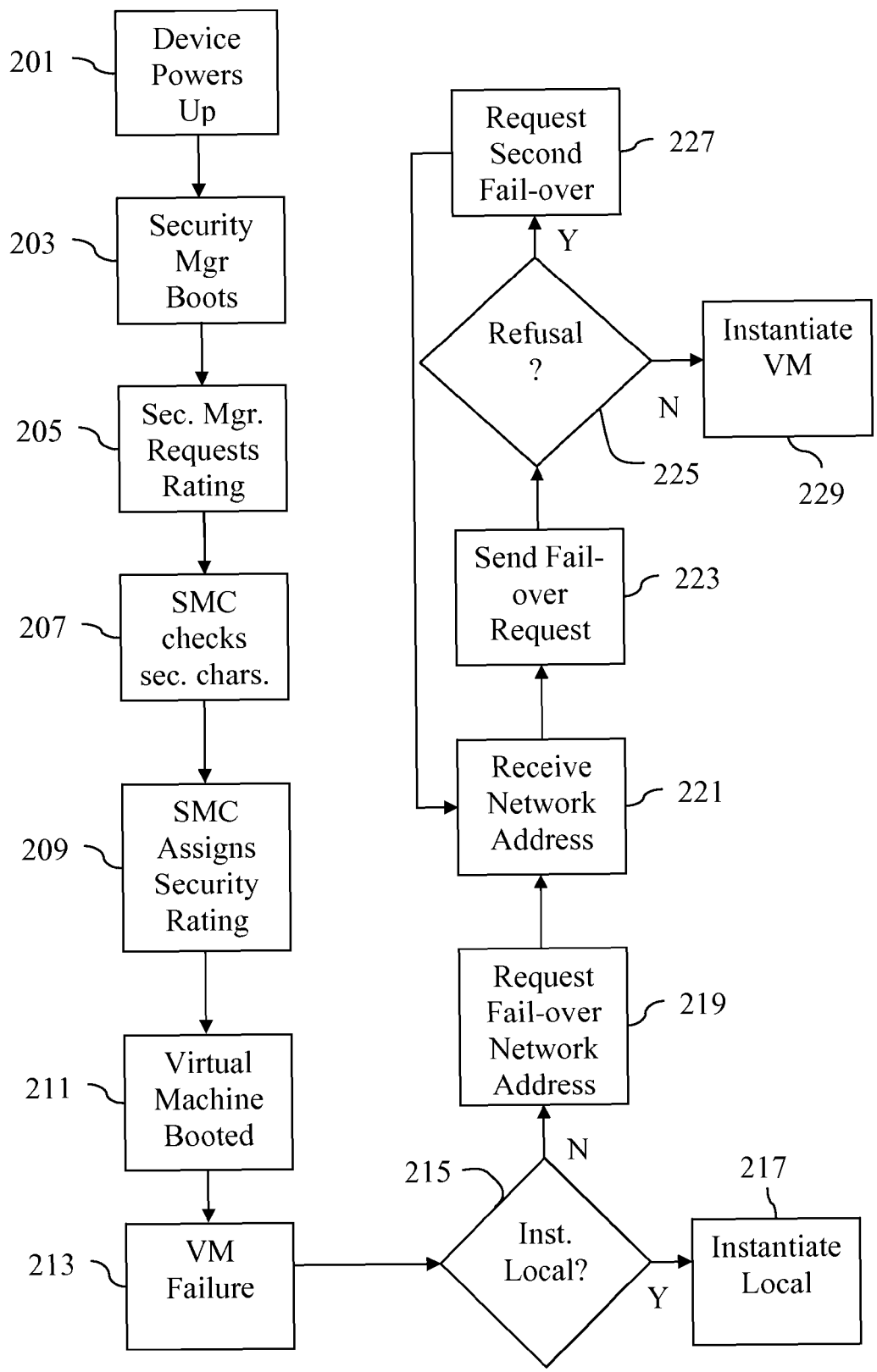
FIG. 2 illustrates a method of receiving a security rating and requesting a fail-over instantiation of a virtual-machine with a minimum security rating in accordance with various embodiments.

FIG. 2 illustrates a method for receiving a security rating and requesting a fail-over instantiation of a virtual-machine with a minimum security rating in accordance with various embodiments. In embodiments, the process may begin when a primary computing device—for example primary computing device 101 of FIG. 1—powers up 201. Upon powering up, a security manager—such as for example security manager 103 of FIG. 1—may boot 203. The security manager may then request a security rating by sending a request to a security management console 205. The security management console may, upon receiving the request, check security characteristics information of the primary computing device 207. Such information may include, for example, a physical location of the primary computing device, security controls of the primary computing device (such as, for example, internal and/or external firewalls protecting the device and physical controls protecting the device), a function of the primary computing device, the criticality of the data stored on the primary computing device, hardware redundancy, and/or other information. In embodiments, some or all of the information may be manually entered into either a database of the security management console or the primary computing device. In alternate embodiments, some or all of the information may be determined in an automated fashion, such as a self-attest or other method. In embodiments where some or all of the information is located in the primary computing device, it may be sent to the security management console either as part of the request or in a separate message either before or after sending the request.

Next, the security management console may assign a security rating to the primary computing device 209. Such a rating may be based on the security characteristics information of the primary computing device. Various rating algorithms may be used in various embodiments. Also, various rating systems may be utilized in embodiments. For example, a numerical (1, 2, 3 . . . ), alphabetic (A, B, C . . . ), descriptive ("high", "medium", "low" . . . ), or other rating system may be used in embodiments. Embodiments are not limited to any one or set of rating labels or nomenclature.

As used herein and in the claims, if a first security rating "exceeds" a second security rating, then a device assigned the first security rating is considered to have overall security characteristics superior to a device with the second security rating. In other words, it may be determined, for example, to be better protected from potential intruders, to have better data safeguards, and/or have more secure physical and/or logical controls among other things. In embodiments, a numerical rating system may be used wherein a low number—for example a "1"—indicates a more secure rating than a higher number—for example a "2". In this example, a security rating of "1" would "exceed" a security rating of "2". In alternative embodiments, the opposite may be true: if a device with a security rating of "2" is considered to be more secure than a device with a security rating of "1", then a security rating of "2" would "exceed" a security rating of "1".

Next, the primary computing device may boot a virtual-machine 211. After a period of time, the primary computing device may detect a failure of the virtual-machine 213. Failures may include operating system crashes, physical device failures such as hard disk or other failures, and/or any runtime error that prevents the proper functioning of the virtual-machine. Upon detecting virtual-machine failure, the primary computing device may determine whether to instantiate a local fail-over virtual-machine 215. If so, a local fail-over virtual-machine is instantiated 217. Reasons for instantiating a local virtual-machine fail-over—rather than instantiating a fail-over virtual-machine on another device—are beyond the scope of this disclosure.

If local instantiation is determined to be inappropriate, the security manager may in embodiments request a network address or other identifier for a fail-over device 219. This request may be sent to a trusted computing device to limit the possibility of receiving a network address of a compromised device. In embodiments, such a trusted computing device may return one or more network addresses, for example IP addresses or other network identifiers including some form of an information source identifier such as a uniform resource identifier (URL) or other. In embodiments, this trusted computing device may return network addresses or other identifier of device(s) known to meet or exceed some predetermined assigned security rating such as, for example, a minimum security rating based on the assigned security rating of the primary computing device. In these embodiments, the trusted source may act as a second layer of security enforcement and may also make the system more efficient by not providing the primary computing device with identifiers of fail-over computing device(s) known to have security ratings lower than the required minimum. In such embodiments, requests sent to the trusted computing source may contain a required minimum security rating. In embodiments, the trusted computing device may return only network addresses or other identifiers of fail-over computing devices known to include a security manager. In embodiments, the trusted computing device and the security management console may be the same.

Once the primary computing device receives the fail-over network address 221, the security manager may send a request to the fail-over computing device using the received fail-over network address to instantiate a virtual-machine to take over for the failed virtual-machine running on the primary computing device 223. In embodiments, the request may include a minimum security rating. In embodiments, the minimum security rating may be the same as the security rating assigned to the primary computing device, or other security rating. If the security manager receives a refusal 225, it may then request a second network address of a second fail-over device 227. If it does not receive a refusal message, the process on the primary computing device may end and the fail-over device may instantiate the virtual-machine 229. In embodiments where the security manager receives network addresses or other identifiers of multiple potential fail-over devices it may, upon receiving a refusal from one, send to another without requesting another network address.

Figure 3:
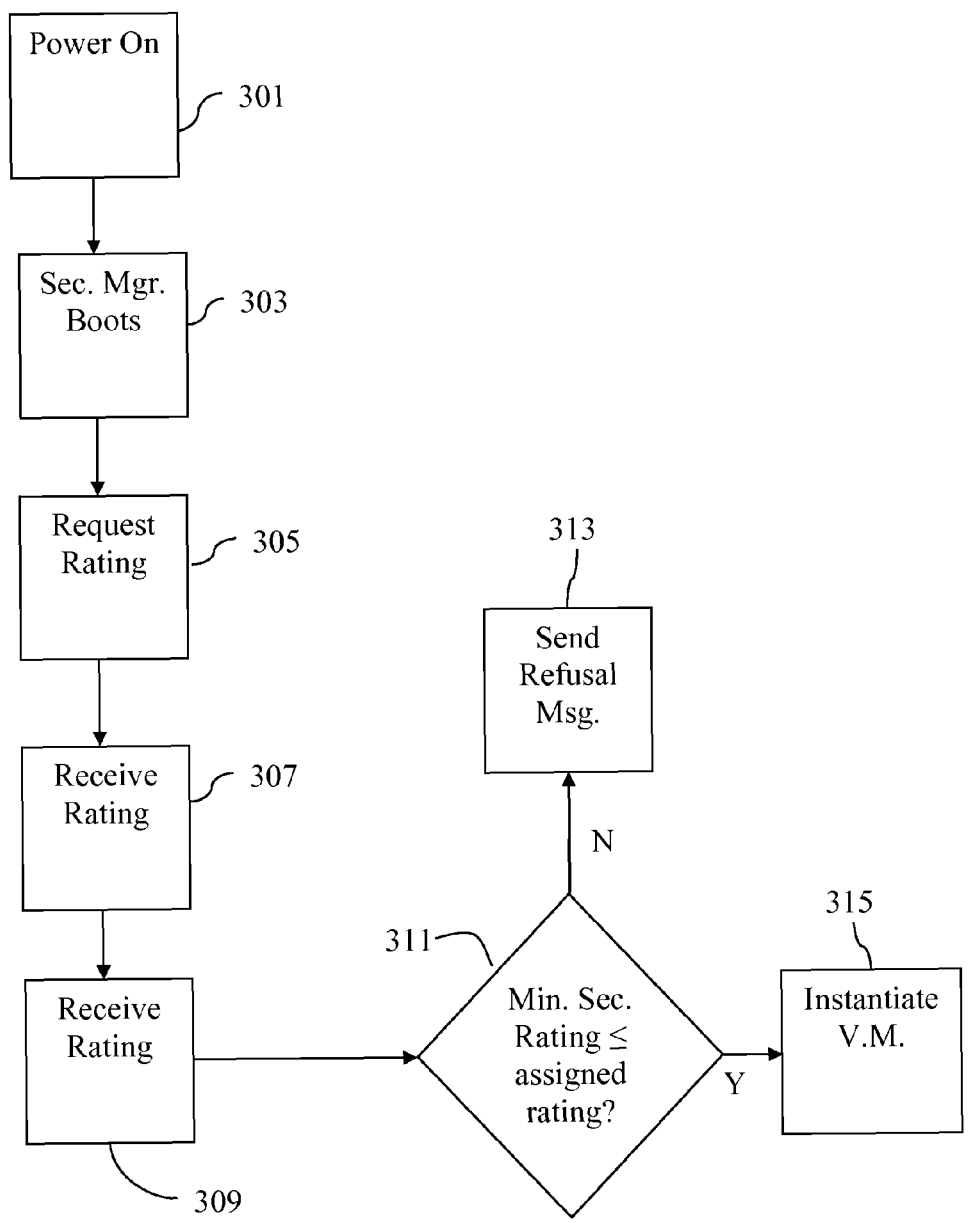
FIG. 3 illustrates a method of receiving a security rating and receiving a request to instantiate a virtual-machine with a minimum security rating in accordance with various embodiments.

FIG. 3 illustrates a method of receiving a security rating and receiving a request to instantiate a virtual-machine with a minimum security rating in accordance with various embodiments. The process begins when a fail-over computing device—such as for example fail-over computing device 111 of FIG. 1—powers on 301. A security manager boots 303 and requests a security rating from a security management console 305. As with the process depicted in FIG. 2, the security management console may, upon receiving the request, check security characteristics information of the fail-over computing device. Such information may include, for example, a physical location of the fail-over computing device, security controls of the fail-over computing device (such as, for example, internal and/or external firewalls protecting the device and physical controls protecting the device), a function of the fail-over computing device, the criticality of the data stored on the fail-over computing device, hardware redundancy, and other information. In embodiments, such information may be manually entered into either a database of the security management console or the fail-over computing device. In alternate embodiments, such information may be determined in an automated fashion. In embodiments where the information is located only in the fail-over computing device, it may be sent to the security management console either as part of the request or separately either before or after sending the request.

Next, the fail-over computing device may receive an assigned rating 307. Such a rating may be based on the security characteristics information of the fail-over computing device. Various rating systems may be utilized in embodiments. See the description of FIG. 2 for more details.

After a period of time, the fail-over computing device may receive a fail-over request including a minimum security rating 309 from a primary computing device—such as for example primary computing device 101 in FIG. 1. The fail-over computing device may then check to make sure that its assigned rating meets or exceeds the minimum security rating contained within the request 311. If the assigned rating is less than the minimum security rating, the fail-over computing device may send a refusal message to the primary computing device 313. If the assigned rating meets or exceeds the minimum security rating, the fail-over device may instantiate a virtual-machine to perform the function(s) of the failed virtual-machine on the primary computing device 315.

Figure 4:
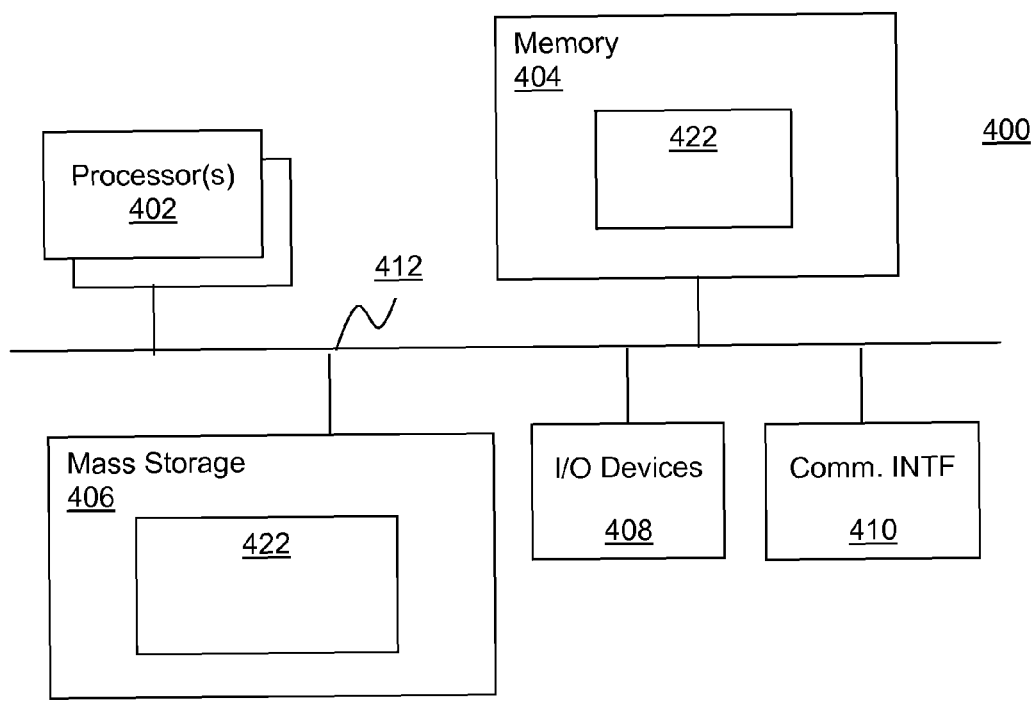
FIG. 4 illustrates an example computer system suitable for use to practice client device and/or server aspects of various embodiments of the present invention.

FIG. 4 illustrates an example computer system suitable for use to practice client device and/or server aspects of various embodiments of the present invention. As shown, computing system 400 includes a number of processors or processor cores 402, and system memory 404. For the purpose of this application, including the claims, the terms "processor" and "processor cores" may be considered synonymous, unless the context clearly requires otherwise. Additionally, computing system 400 includes mass storage devices 406 (such as diskette, hard drive, compact disc read only memory (CDROM) and so forth), input/output devices 408 (such as display, keyboard, cursor control and so forth) and communication interfaces 410 (such as network interface cards, modems and so forth). The elements are coupled to each other via system bus 412, which represents one or more buses. In the case of multiple buses, they are bridged by one or more bus bridges (not shown).

Each of these elements performs its conventional functions known in the art. In particular, system memory 404 and mass storage 406 may be employed to store a working copy and a permanent copy of the programming instructions implementing the various components, such as security managers 103 and 113, virtual-machines 105 and 115, and security rating module 123, herein collectively denoted as 422. The various components may be implemented by assembler instructions supported by processor(s) 402 or high-level languages, such as, for example, C, that can be compiled into such instructions.

The permanent copy of the programming instructions may be placed into permanent storage 406 in the factory, or in the field, through, for example, a distribution medium (not shown), such as a compact disc (CD), or through communication interface 410 (from a distribution server (not shown)). That is, one or more distribution media having an implementation of the agent program may be employed to distribute the agent and program various computing devices.

The constitution of these elements 402-412 are known, and accordingly will not be further described.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present disclosure. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
  receiving, by a fail-over computing device upon powering on of the fail-over computing device, an assigned security rating from a security management console;
  receiving, by the fail-over computing device, a request to instantiate a virtual-machine in response to a virtual-machine failure on a separate physical device, the request including a minimum security rating;
  comparing, by the fail-over computing device, the minimum security rating against the assigned security rating of the fail-over computing device;
  instantiating, by the fail-over computing device, the virtual-machine if the assigned security rating meets or exceeds the minimum security rating; and
  sending, by the fail-over computing device, a refusal message to the separate physical device to refuse the request to instantiate a virtual-machine if the assigned security rating is lower than the minimum security rating, the refusal message prompting the separate physical device to request another fail-over computing device.

2. The method of claim 1 further comprising sending, by the fail-over device, an assigned security rating request, the assigned security rating request including one or more of a physical location of the fail-over device and a list of security controls of the fail-over device and wherein the received security rating is received in response to the request.

3. The method of claim 1 further comprising sending, by the separate physical device to a second fail-over device, a second request to instantiate a virtual-machine, the sending of the second request in response to receiving the refusal message from the fail-over device.

4. The method of claim 1 further comprising requesting, by the separate physical device upon the virtual-machine failure, a fail-over network address and receiving, in response, a network address of the fail-over device.

5. The method of claim 4 further comprising sending, by the separate physical device, the request to instantiate a virtual-machine to the fail-over device using the network address of the fail-over device.

6. An article of manufacture comprising:
  a computer-readable non-transitory storage medium; and
  a plurality of programming instructions stored on the storage medium and configured to program a fail-over device to enable the fail-over device to:
    receive, upon powering on of the fail-over computing device, an assigned security rating from a security management console;
    receive a request to instantiate a virtual-machine in response to a virtual-machine failure on a separate physical device, the request including a minimum security rating;
    compare the minimum security rating against the assigned security rating of the fail-over computing device;
    initiate an instantiation of the virtual-machine if the assigned security rating meets or exceeds the minimum security rating; and
    send a refusal message to the separate physical device to refuse the request to instantiate a virtual-machine if the assigned security rating is lower than the minimum security rating.

7. The article of claim 6 wherein the plurality of programming instructions are further configured to program the fail-over device to send a request for the assigned security rating, the request for the assigned security rating including one or more of a physical location of the fail-over device and a list of security controls of the fail-over device.

8. A server system comprising:
  a processor;
  a disc storage device coupled to the processor and adapted to store a security manager; and
  the security manager, configured to be operated by the processor to:

receive, upon powering on of a fail-over computing device, an assigned security rating from a security management console;

receive a request to instantiate a virtual-machine in response to a virtual-machine failure on a separate physical device, the request including a minimum security rating;

compare the minimum security rating against the assigned security rating of the fail-over computing device;

initiate an instantiation of the virtual-machine if the assigned security rating meets or exceeds the minimum security rating; and send a refusal message to the separate physical device to refuse the request to instantiate a virtual-machine if the assigned security rating is lower than the minimum security rating.

9. The system of claim 8 wherein the security manager is further configured to be operated by the processor to send a request for the assigned security rating, the request for the assigned security rating including one or more of a physical location of the fail-over device and a list of security controls of the fail-over device.

* * * * *